US012449188B2

(12) United States Patent
Jang et al.

(10) Patent No.: US 12,449,188 B2
(45) Date of Patent: Oct. 21, 2025

(54) REFRIGERATOR

(71) Applicant: LG Electronics Inc., Seoul (KR)

(72) Inventors: Jongmoon Jang, Seoul (KR); Joonyong Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/409,245

(22) Filed: Jan. 10, 2024

(65) Prior Publication Data

US 2024/0142163 A1 May 2, 2024

Related U.S. Application Data

(63) Continuation of application No. 18/119,013, filed on Mar. 8, 2023, now Pat. No. 11,906,238, which is a (Continued)

(30) Foreign Application Priority Data

Jun. 17, 2020 (KR) ........................ 10-2020-0073926

(51) Int. Cl.
*F25D 23/02* (2006.01)
*E05D 11/00* (2006.01)

(52) U.S. Cl.
CPC ........ *F25D 23/028* (2013.01); *E05D 11/0054* (2013.01); *E05Y 2900/31* (2013.01); (Continued)

(58) Field of Classification Search
CPC . E05D 11/0054; E05D 11/0081; E05D 7/081; E05Y 2900/31; E05Y 2600/41; (Continued)

(56) References Cited

U.S. PATENT DOCUMENTS 5,975,663 A * 11/1999 Becker .................. F25D 23/028 16/374
10,302,349 B2 5/2019 Park et al.
(Continued)

FOREIGN PATENT DOCUMENTS

CN 108826814 A * 11/2018 ............. E05D 11/00
CN 109488140 3/2019
(Continued)

OTHER PUBLICATIONS

English translation of CN 109488140, 2019, 6 pages.
Extended European Search Report in European Appln. No. 21179978.8, dated Nov. 2, 2021, 10 pages.

*Primary Examiner* — Hiwot E Tefera
(74) *Attorney, Agent, or Firm* — Fish & Richardson P.C.

(57) ABSTRACT

A refrigerator includes a cabinet having a storage space, a hinge bracket configured to be installed on an upper wall of the cabinet and having a hinge shaft, a door configured to be connected to the hinge shaft and to open and close the storage space while rotating, and a hinge cover configured to be installed on the upper wall of the cabinet and to cover the hinge bracket, in which the hinge cover includes a first mounting part and a second mounting part disposed to be spaced apart in a horizontal direction, a bracket cover detachably mounted on one mounting part of the first mounting part and the second mounting part disposed at a position corresponding to the hinge bracket and configured to cover the hinge bracket, and a shielding member detachably mounted on another mounting part of the first mounting part and the second mounting part.

18 Claims, 12 Drawing Sheets

Related U.S. Application Data continuation of application No. 17/350,279, filed on Jun. 17, 2021, now Pat. No. 11,624,548.

(52) U.S. Cl.
CPC .. *F25D 2323/022* (2013.01); *F25D 2323/024* (2013.01); *F25D 2400/18* (2013.01)

(58) Field of Classification Search
CPC ......... F25D 2323/024; F25D 2323/022; F25D 2400/40; F25D 23/028; F25D 2400/18
See application file for complete search history.

(56) References Cited

U.S. PATENT DOCUMENTS

| | | | | |
|---|---|---|---|---|
| 2004/0206106 | A1 | 10/2004 | Lee | |
| 2005/0284159 | A1 | 12/2005 | Kim | |
| 2006/0017361 | A1 | 1/2006 | Rendel et al. | |
| 2006/0064846 | A1* | 3/2006 | Espindola | E05D 7/081 16/223 |
| 2008/0172838 | A1 | 7/2008 | Choi | |
| 2008/0203874 | A1 | 8/2008 | Lim et al. | |
| 2010/0218547 | A1 | 9/2010 | Rothmund et al. | |
| 2010/0231110 | A1 | 9/2010 | Choi | |
| 2014/0132144 | A1 | 5/2014 | Kim et al. | |
| 2015/0233629 | A1 | 8/2015 | Choi et al. | |
| 2016/0245579 | A1* | 8/2016 | Eom | E05F 5/02 |
| 2017/0188721 | A1 | 7/2017 | Park et al. | |
| 2017/0350644 | A1 | 12/2017 | Xia et al. | |
| 2018/0031302 | A1 | 2/2018 | Park et al. | |
| 2018/0187952 | A1 | 7/2018 | Lv et al. | |
| 2018/0187955 | A1* | 7/2018 | Son | F25D 23/028 |
| 2019/0257571 | A1 | 8/2019 | Park et al. | |
| 2019/0269259 | A1 | 9/2019 | Park et al. | |

FOREIGN PATENT DOCUMENTS

| | | | | |
|---|---|---|---|---|
| DE | 102008040608 | | 1/2010 | |
| KR | 20080079112 | | 8/2008 | |
| WO | WO 2010007079 | | 1/2010 | |
| WO | WO 2010029094 | | 3/2010 | |
| WO | WO-2012025396 | A2 * | 3/2012 | E05D 11/00 |
| WO | WO-2016177427 | A1 * | 11/2016 | E05D 5/14 |

* cited by examiner

REFRIGERATOR

CROSS-REFERENCE TO RELATED APPLICATION

The present application is a continuation of U.S. application Ser. No. 18/119,013, filed on Mar. 8, 2023, which is a continuation of U.S. application Ser. No. 17/350,279, filed on Jun. 17, 2021, now U.S. Pat. No. 11,624,548, which claims priority under 35 U.S.C. 119 and 35 U.S.C. 365 to Korean Patent Application No. 10-2020-0073926, filed on Jun. 17, 2020, which are hereby incorporated by reference in their entirety.

TECHNICAL FIELD

The present specification relates to a refrigerator.

BACKGROUND

The door of the refrigerator constitutes the front surface of the refrigerator. The user opens the door of the refrigerator to take out food stored in the refrigerator and closes the door to cool and store the food in the refrigerator.

As described above, the door of the refrigerator is a component which is mainly operated by the user, and the opening type of the door of the refrigerator may be changed according to the installation position of the refrigerator.

As an example, in a case where the refrigerator door is configured in a rotation type, depending on the installation position of the refrigerator, the hinge is connected to the right side of the refrigerator door to rotate the refrigerator door to the right, or the hinge is connected to the left side of the refrigerator door to rotate the refrigerator door to the left.

Some example refrigerators include a top panel. In such examples, it is characterized in that the top cover is provided on an upper surface of a main body having a door that is pivotally opened and closed, and a hinge cover part covering the hinge shaft of the door and a top cover part covering the front of the upper surface of the main body are integrally provided.

The hinge cover part includes a hinge main body part which is provided on the upper surface of the main body to cover the base bracket of the hinge assembly, and a hinge shaft part which is provided to protrude forward from the hinge main body part to be capable of covering the hinge shaft of the hinge assembly provided on the door so as to fit into the base bracket. The hinge shaft part is formed integrally with the hinge main body part.

In these example refrigerators, since the hinge shaft part and the hinge main body part are integrally formed, there is a disadvantage that all of the top panels including the hinge cover part have to be replaced in a case where the rotation direction of the door is to be changed.

SUMMARY

The present embodiment provides a refrigerator capable of changing a rotation direction of a door by replacing components detachable from the hinge cover without replacing the entire hinge cover.

Optionally or additionally, the present embodiment provides a refrigerator in which a slot in which an unused bracket cover is located is prevented from being exposed to the outside when the rotation direction of a door is changed.

Optionally or additionally, the present embodiment provides a refrigerator in which an electric wire connection operation is easy when the rotation direction of a door is changed.

Particular implementations of the present disclosure provide a refrigerator that includes a cabinet defining a storage space, a hinge bracket positioned at an upper wall of the cabinet and having a hinge shaft, a door connected to the hinge shaft and configured to rotate around the hinge shaft to thereby open and close the storage space of the cabinet, and a hinge cover positioned at the upper wall of the cabinet and covering the hinge bracket. The hinge cover includes a first mounting part, a second mounting part spaced apart from the first mounting part, a bracket cover, and a shielding member. The bracket cover is detachably mounted at one of the first mounting part and the second mounting part. The first mounting part may be disposed at a position corresponding to the hinge bracket. The bracket cover is configured to cover the hinge bracket. The shielding member is detachably mounted at the other of the first mounting part and the second mounting part.

In some implementations, the refrigerator can optionally include one or more of the following features. The hinge cover may include a cover body that has a front wall and side walls extending from opposite ends of the front wall. Each of the first mounting part and the second mounting part may be defined at the front wall of the cover body. Each of the first mounting part and the second mounting part includes a slot that penetrates the front wall and extends upward from a lower surface of the front wall of the cover body, and a fixing protrusion extending from a surface that defines the slot. The fixing protrusion may be configured to be coupled to the bracket cover or the shielding member. The shielding member may include a coupling body that corresponds to the slot. The coupling body of the shielding member may include a protruding groove configured to receive the fixing protrusion of each of the first mounting part and the second mounting part. The shielding member and the bracket cover may be configured to be mounted at each of the first mounting part and the second mounting part in a first direction. Each of the first mounting part and the second mounting part may include a restriction protrusion configured to restrict movement of the shielding member and the bracket cover in a second direction intersecting the first direction. The coupling body of the shielding member may include a protrusion hole configured to receive the restriction protrusion. The slot may be defined by opposite side surfaces and an upper surface extending between upper sides of the opposite side surfaces. The fixing protrusion may be provided at each of the opposite side surfaces of the slot. The restriction protrusion may protrude from the upper surface of the slot. The bracket cover may include a bracket cover body configured to cover the hinge bracket, and a coupling part extending from the bracket cover body and corresponding to the slot. The coupling part of the bracket cover may include a protruding groove configured to receive the fixing protrusion. The protrusion groove may include an engagement protrusion configured to engage with the fixing protrusion based on the fixing protrusion being received in the protrusion groove. The shielding member and the bracket cover may be configured to be mounted at each of the first mounting part and the second mounting part in a first direction. Each of the first mounting part and the second mounting part may include a restriction protrusion configured to restrict movement of the shielding member and the bracket cover in a second direction intersecting the first direction. The coupling part of the shielding member may include a protrusion hole configured to receive the restriction protrusion. The slot may be defined by opposite side surfaces and an upper surface extending between upper sides of the opposite side surfaces. The fixing protrusion may be provided at each of the opposite side surfaces of the slot. The restriction protrusion may protrude from the upper surface of the slot. The shielding member may further include a coupling guide extending from the coupling body. The coupling guide may have (i) a larger width than the coupling body and (ii) an upper surface located higher than the upper surface of the coupling body. The coupling guide may be located at a rear side of the front wall of the cover body based on the shielding member being mounted at the other of the first mounting part and the second mounting part. The cabinet may include a cabinet front wall and a rounded connection wall connecting the cabinet front wall and the upper wall of the cabinet. A lower end part of the coupling body of the shielding member may be configured to cover the rounded connection wall of the cabinet. The bracket cover may include a bracket coupling guide extending from the coupling part. The bracket coupling guide may have (i) a larger width than the coupling part and (ii) an upper surface located higher than the upper surface of the coupling part. The bracket coupling guide may be located at a rear side of the front wall based on the bracket cover being mounted on the one of the first mounting part and the second mounting part. The bracket cover body may include a cover body upper wall and a circumferential wall extending downward from a circumference of the cover body upper wall. The cover body upper wall may define an opening through which an electric wire passes. The bracket cover may further include an opening cover coupled to the bracket cover body and configured to cover the opening of the bracket cover. The cover body upper wall may include a seating part that is recessed downward. The opening of the bracket cover may be defined at the seating part. The opening cover may be located at the seating part and covers the opening of the bracket cover. The opening cover may include a hook configured to couple with the cover body. The seating part may define a slit through which the hook passes. The opening cover may cover a first part of the opening of the bracket cover. The electric wire may be located at a second part of the opening that is different from the first part of the opening of the bracket cover.

Particular implementations of the present disclosure provide a refrigerator that includes a cabinet defining a storage space, a hinge bracket, a door, and a hinge cover. The hinge bracket is configured to be selectively positioned at one of a first position and a second position of an upper wall of the cabinet. The hinge bracket has a hinge shaft. The door is connected to the hinge shaft and configured to rotate around the hinge shaft to thereby open and close the storage space of the cabinet. The hinge cover is positioned at the upper wall of the cabinet and covering the hinge bracket. The hinge cover includes a first mounting part, a second mounting part spaced apart from the first mounting part, a bracket cover, and a shielding member. The bracket cover may be configured to be mounted (i) at the first mounting part to thereby cover the hinge bracket based on the hinge bracket being positioned at the first position and (ii) at the second mounting part to thereby cover the hinge bracket based on the hinge bracket being positioned at the second position. The shielding member may be configured to be mounted (i) at the second mounting part based on the hinge bracket being positioned at the first position and (ii) at the first mounting part based on the hinge bracket being positioned at the second position.

In some implementations, the refrigerator can optionally include one or more of the following features. Each of the first mounting part and the second mounting part may include a slot configured to extend upward from a lower end of the hinge cover. The shielding member and the bracket cover may be slidingly coupled to the slot. Each of the first mounting part and the second mounting part may include a fixing protrusion that is provided at a surface defining the slot and configured to be coupled to each of the shielding member and the bracket cover.

A refrigerator according to an aspect may include a cabinet having a storage space, a hinge bracket configured to be installed on an upper wall of the cabinet and having a hinge shaft, a door configured to be connected to the hinge shaft and to open and close the storage space while rotating, and a hinge cover configured to be installed on the upper wall of the cabinet and to cover the hinge bracket.

The hinge cover may include a first mounting part and a second mounting part disposed to be spaced apart in a horizontal direction.

The hinge cover may include a bracket cover detachably mounted on one mounting part of the first mounting part and the second mounting part disposed at a position corresponding to the hinge bracket and configured to cover the hinge bracket, and a shielding member detachably mounted on another mounting part of the first mounting part and the second mounting part.

The hinge cover may include a cover body including a front wall and side walls extending from both ends of the front wall. Each of the first mounting part and the second mounting part may be formed on the front wall.

Each of the first and second mounting parts may include a slot configured to penetrate the front wall and to extend upward from a lower surface of the front wall. Each of the first and second mounting parts may further include a fixing protrusion formed on a surface forming the slot and coupled to the bracket cover or the shielding member.

The shielding member may include a coupling body formed in a shape and size corresponding to the slot.

The coupling body may include a protruding groove in which the fixing protrusion is received.

The shielding member and the bracket cover may be mounted on each of the first and second mounting parts in a first direction. Each of the first and second mounting parts may further include a restriction protrusion configured to restrict movement of the shielding member and the bracket cover in a second direction intersecting the first direction.

The coupling body may include a protrusion hole through which the restriction protrusion passes.

The slot may be defined by both side surfaces and an upper surface connecting upper sides of both side surfaces, and the fixing protrusion may be provided on each of both side surfaces.

The restriction protrusion may protrude from the upper surface.

The bracket cover may include a cover body configured to cover the hinge bracket, and a coupling part configured to extend from the cover body and formed in a shape and size corresponding to the slot.

The coupling part may include a protruding groove in which the fixing protrusion is received.

An engagement protrusion configured to engage the fixing protrusion in a state where the fixing protrusion is received in the protrusion groove may be provided in the protrusion groove.

The shielding member and the bracket cover may be mounted on each of the first and second mounting parts in a first direction. Each of the first and second mounting parts may further include a restriction protrusion configured to restrict movement of the shielding member and the bracket cover in a second direction intersecting the first direction. The coupling part may include a protrusion hole through which the restriction protrusion passes.

The slot may be defined by both side surfaces and an upper surface connecting upper sides of both side surfaces, and the fixing protrusion may be provided on each of both side surfaces. The restriction protrusion may protrude from the upper surface.

The shielding member may further include a coupling guide configured to extend from the coupling body and having a larger width in the left and right direction than the coupling body and an upper surface located higher than the upper surface of the coupling body.

The coupling guide may be located at a rear side of the front wall when the shielding member is mounted on one mounting part.

The cabinet may include a front wall and a rounded connection wall configured to connect the front wall and the upper wall. The lower end part of the coupling body may cover the connection wall.

The bracket cover may further include a coupling guide configured to extend from the coupling part and having a larger width in the left and right direction than the coupling part and an upper surface located higher than the upper surface of the coupling part.

The coupling guide may be located at a rear side of the front wall when the bracket cover is mounted on one mounting part.

The cover body may include an upper wall and a circumferential wall configured to extend downward from a circumference of the upper wall.

The upper wall may be provided with an opening through which an electric wire passes. The bracket cover may further include an opening cover coupled to the cover body to cover the opening.

The upper wall of the cover body may be provided with a seating part which is recessed downward. The opening may be provided in the seating part, and the opening cover may be located in the seating part in a state of covering the opening.

The opening cover may include a hook configured to couple with the cover body. A slit through which the hook passes may be formed in the seating part.

The opening cover may cover a part of the opening, and the electric wire may be located at a portion of the opening which is not covered by the opening cover.

A refrigerator according to another aspect may include a cabinet having a storage space, a hinge bracket configured to be selectively installed at one of a first position and a second position of an upper wall of the cabinet and having a hinge shaft, a door configured to be connected to the hinge shaft and to open and close the storage space while rotating, and a hinge cover configured to be installed on the upper wall of the cabinet and to cover the hinge bracket.

The hinge cover may include a first mounting part and a second mounting part configured to be disposed to be spaced apart in a horizontal direction, a bracket cover configured to be mounted on the first mounting part when the hinge bracket is installed in the first position and configured to be mounted on the second mounting part to cover the hinge bracket when the hinge bracket is installed in the second position, and a shielding member configured to be mounted on the second mounting part when the hinge bracket is installed in the first position and configured to be mounted on the first mounting part when the hinge bracket is installed in the second position.

The hinge cover may be installed in the cabinet in a state where the shielding member and the hinge bracket are mounted.

Each of the first and second mounting parts may include a slot configured to extend upward from a lower end of the hinge cover. The shielding member and the bracket cover may be slidingly coupled to the slot. A fixing protrusion configured to be coupled to each of the shielding member and the bracket cover may be provided on a surface forming the slot.

The surface forming the slot may include a restriction protrusion configured to couple with each of the shielding member and the bracket cover.

DETAILED DESCRIPTION OF THE EMBODIMENTS

Figure 1:
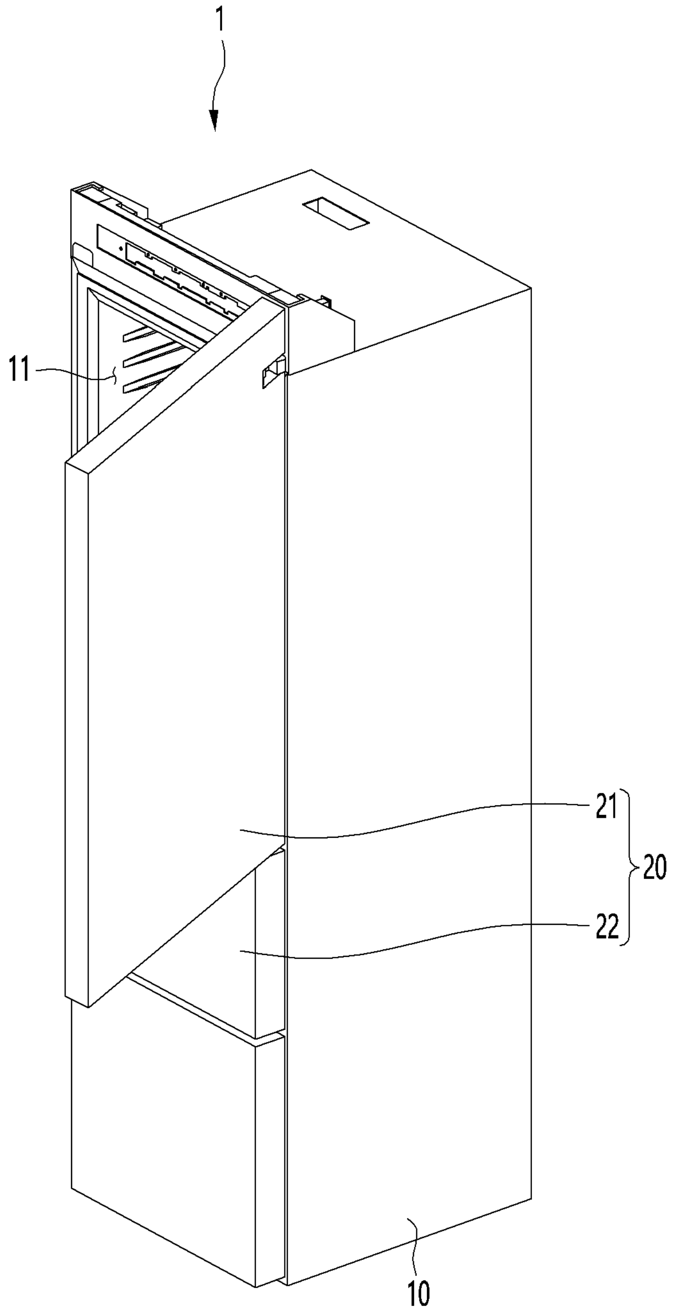
FIG. 1 is a view illustrating a state where some doors of the refrigerator according to the present embodiment are opened.

Hereinafter, some embodiments of the present disclosure will be described in detail with reference to the accompanying drawings. It should be noted that when components in the drawings are designated by reference numerals, the same components have the same reference numerals as far as possible even though the components are illustrated in different drawings. Further, in description of embodiments of the present disclosure, when it is determined that detailed descriptions of well-known configurations or functions disturb understanding of the embodiments of the present disclosure, the detailed descriptions will be omitted.

Also, in the description of the embodiments of the present disclosure, the terms such as first, second, A, B, (a) and (b) may be used. Each of the terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

Figure 2:
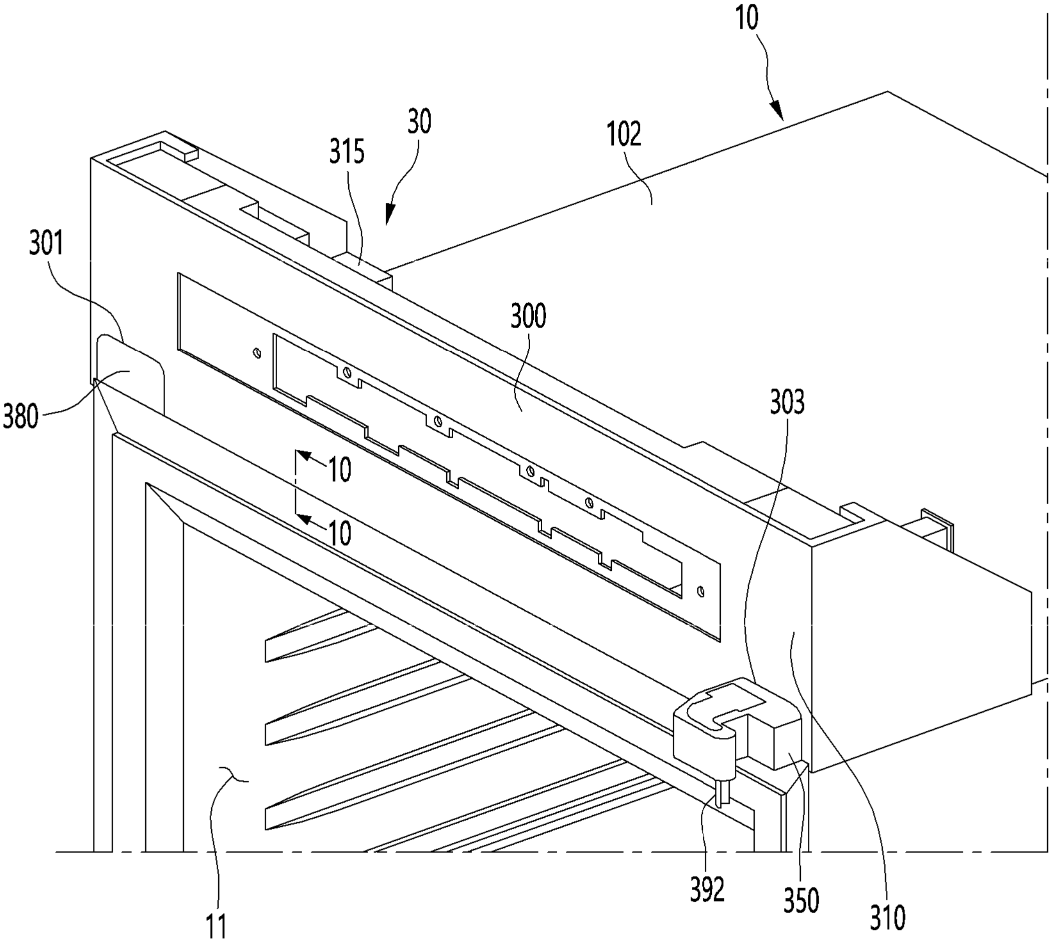
FIG. 2 is a view illustrating a state where a hinge cover whose rotation direction is determined so that the door is rotated in one direction is installed in the cabinet.
Figure 3:
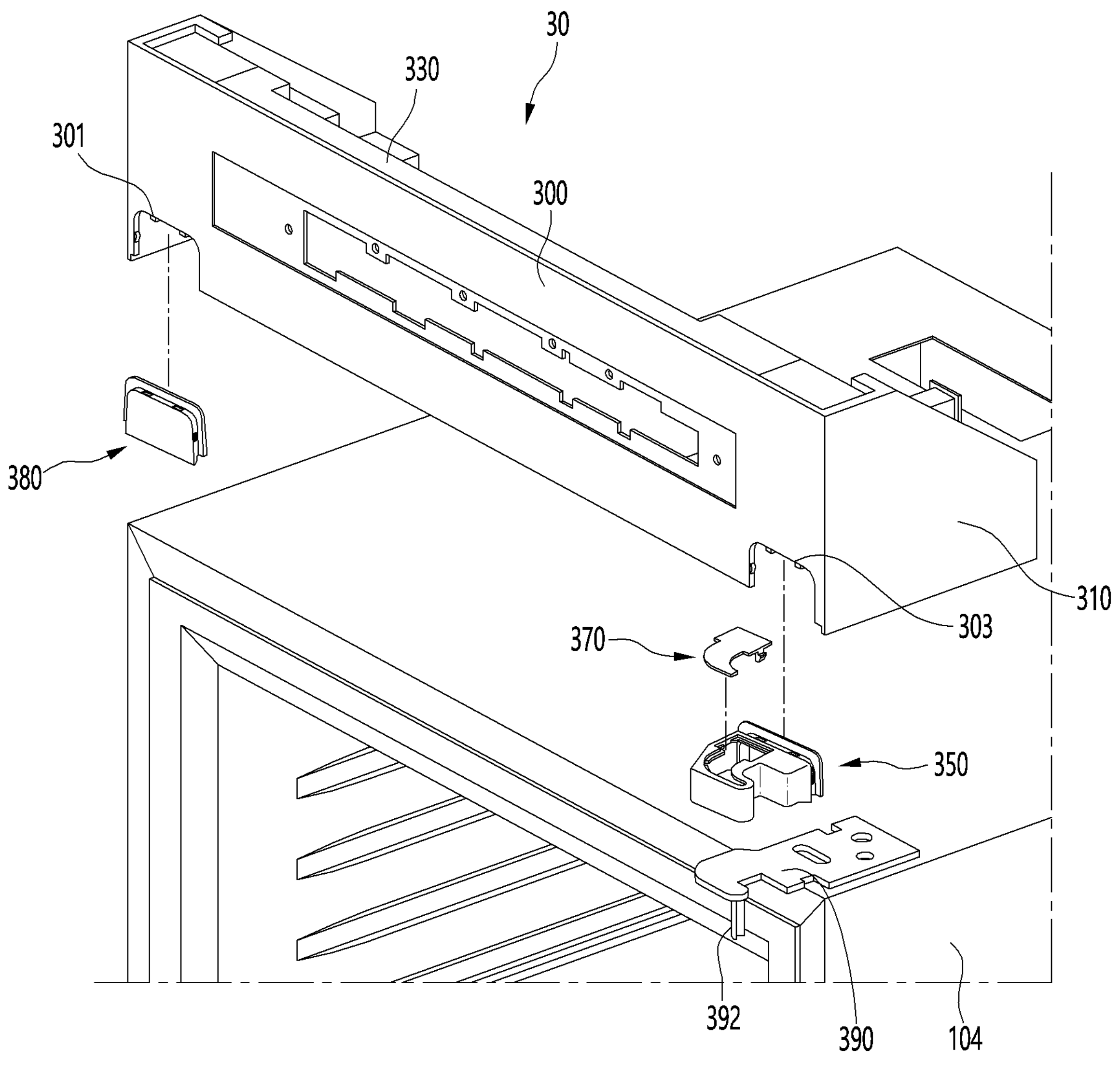
FIG. 3 is an exploded perspective view illustrating the hinge cover of FIG. 2.

FIG. 1 is a view illustrating a state where some doors of the refrigerator according to the present embodiment are opened, FIG. 2 is a view illustrating a state where a hinge cover whose rotation direction is determined so that the door is rotated in one direction is installed in the cabinet, and FIG. 3 is an exploded perspective view illustrating the hinge cover of FIG. 2.

Referring to FIGS. 1 to 3, the refrigerator 1 of the present embodiment may include a cabinet 10 forming a storage space, and a door 20 for opening and closing the storage space.

The cabinet 10 may include one independent storage space or may include a plurality of separate storage spaces. Hereinafter, an example in which the cabinet 10 includes a plurality of storage spaces will be described. However, it should be noted that even when the cabinet 10 includes one storage space, the hinge cover described below and the technique of changing the rotation direction of the door using the hinge cover are applied as it is.

The storage space may include a first storage space 11. The first storage space 11 may be located at an upper part among a plurality of storage spaces, for example. The first storage space 11 may be opened and closed by a door 21 of a type which is rotated by a hinge.

The storage space may include a second storage space located below the first storage space 11, and the second storage space may be opened and closed by one or more doors 22. At least one door 22 may be, for example, a sliding door.

Hereinafter, it will be described that the rotation direction of the door 21 of the rotation type can be changed, and the door of the rotation type will be referred to as "door 21".

The refrigerator 1 may further include a hinge cover 30 mounted on the upper wall 102 of the cabinet 10. The hinge cover 30 covers a hinge bracket 390 to be described later.

The hinge cover 30 may include a cover body. The cover body may include a front wall 300 and a pair of side walls 310 extending rearward from both ends of the front wall 300.

In the present embodiment, "front" refers to a direction from the cabinet 10 toward the door 21, and "rear" refers to a direction away from the door 21.

The hinge cover 30 may further include an upper wall 330 connecting the upper end of the front wall 300 and the pair of side walls 310.

The hinge cover 30 may further include an extension wall 315 extending from the upper wall 330 toward the rear. The extension wall 315 may also be connected to the pair of side walls 310 and may be fastened to the upper wall 102 of the cabinet by a fastening member (not illustrated). Accordingly, at least the lower side of the hinge cover 30 may be opened.

The front wall 300 may include a first mounting part 301 and a second mounting part 303 spaced apart from each other in a horizontal direction. The first mounting part 301 may be located close to the left side wall of the pair of side walls 310, and the second mounting part 303 may be located close to the right side wall of the pair of side walls 310.

The hinge cover 30 may include a bracket cover 350 mounted on any one of the first mounting part 301 and the second mounting part 303 in correspondence with the rotation direction of the door 21, and a shielding member 380 mounted on the other of the first mounting part 301 and the second mounting part 303.

The bracket cover 350 may be detachably mounted on each of the mounting parts 301 and 303. The shielding member 380 may also be detachably mounted on each of the mounting parts 301 and 303.

Therefore, the first mounting part 301 and the second mounting part 303 have the same structure except for only a different position in the hinge cover, and the bracket cover 350 and the shielding member 380, respectively, have the same coupling structure for coupling with each of the mounting parts 301, 303.

Hereinafter, when the refrigerator 1 is viewed from the front of the refrigerator 1, the hinge bracket 390 connected to the right side of the door 21 will be described first.

In this case, the hinge bracket 390 may be installed at a part close to the right wall 104 from the upper wall 102 of the cabinet 10.

To correspond to the hinge bracket 390, the bracket cover 350 may be mounted on the second mounting part 303. When the bracket cover 350 is mounted on the second mounting part 303, the shielding member 380 may be mounted on the first mounting part 301.

Conversely, in order to change the rotation direction of the door 21, the hinge bracket 390 may be connected to the left side of the door 21. In this case, the hinge bracket 390 or a new hinge bracket symmetrical with the hinge bracket 390 may be installed at a position close to the left wall from the upper wall 102 of the cabinet 10. In addition, the bracket cover 350 or a new bracket cover symmetrical thereto may be mounted on the first mounting part 301, and the shielding member 380 may be mounted on the second mounting part 303.

A part of the hinge bracket 390 may be seated on the upper wall 102 of the cabinet 10, and another part thereof may extend forward from the cabinet 10. Among the hinge brackets 390, a hinge shaft 392 may be provided in a part extending forward of the cabinet 10 (hereinafter "extension part"). The hinge shaft 392 can be extended from the hinge bracket 390 to the lower side.

The bracket cover 350 may cover an extension part of the hinge bracket 390 in a state of being mounted on the hinge cover 30. For example, an extension part of the hinge bracket 390 may be received in an inner space of the bracket cover 350.

The bracket cover 350 and the shielding member 380 may be slidably coupled from the lower side to the upper side of the hinge cover 30.

In a state where the bracket cover 350 is coupled to the hinge cover 30, the hinge cover 30 may be fastened to the upper wall 102 of the cabinet 10. When the hinge cover 30 is fastened to the upper wall 102 of the cabinet 10, the bracket cover 350 may cover a part of the hinge bracket 390 exposed to the outside of the cabinet 10, and thus it may be minimized that the hinge bracket 390 is exposed to the outside. For example, a part of the hinge bracket 390 may be received in the bracket cover 350.

The bracket cover 350 may include an opening **352*b* (see FIG. 7) providing a fastening space for a connector for connecting an electric wire drawn out from the inside to the outside of the door 21 and an electric wire extending to the outside of the cabinet 10. The opening may be covered by the opening cover 370**.

Figure 4:
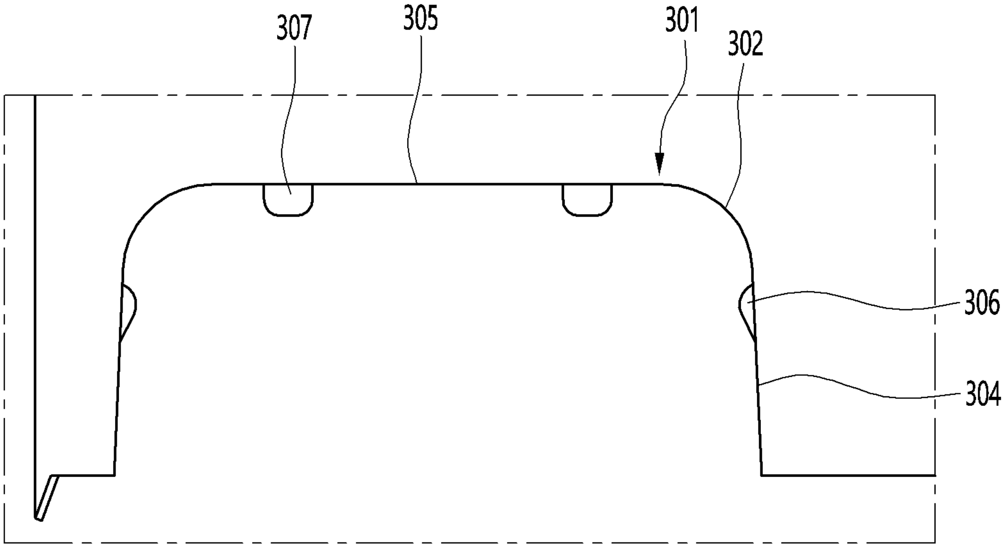
FIG. 4 is a view illustrating a first mounting part of the present embodiment.

FIG. 4 is a view illustrating a first mounting part of the present embodiment.

Referring to FIG. 4, since the structure of the first mounting part 301 is the same as that of the second mounting part 303, only the first mounting part 301 will be described below.

The first mounting part 301 may include a slot 302 for providing a space for the shielding member 380 or the bracket cover 350 to be located.

The slot 302 may be formed as the lower surface of the front wall 300 is recessed upward. Alternatively, the slot 302 may be formed by penetrating a part of the front wall 300 in the front and rear direction and may extend upward from the lower end of the front wall 300.

Therefore, if the shielding member 380 or the bracket cover 350 is moved upward after the shielding member 380 or the bracket cover 350 is aligned under the slot 302, at least a part of the shielding member 380 or the bracket cover 350 may be received in the slot 302.

In order to fix the shielding member 380 or the bracket cover 350 to the first mounting part 301, the first mounting part 301 may include a fixing protrusion 306.

The slot 302 may be defined by both side surfaces 304 and upper surfaces 305. The fixing protrusion 306 may protrude from each of both side surfaces 304.

The fixing protrusion 306 serves to prevent separation in a direction opposite to the direction in which the shielding member 380 or the bracket cover 350 inserted into the slot 302 is coupled. In other words, when the fixing protrusion 306 is coupled to the shielding member 380 or the bracket cover 350, the downside separation of the shielding member 380 or the bracket cover 350 from the first mounting part 301 can be prevented.

The first mounting part 301 may further includes a restriction protrusion 307 for restricting movement in a second direction intersecting the first direction in a state where the shielding member 380 or the bracket cover 350 is mounted on the first mounting part 301. The second direction may be, for example, a front and rear direction and/or a left and right direction.

The restriction protrusion 307 may protrude from the upper surface 305. The restriction protrusion 307 may extend downward from the upper surface 305, for example. In order to effectively restrict the movement of the shielding member 380 or the bracket cover 350, a plurality of restriction protrusions 307 may protrude from the upper surface 305. The plurality of restriction protrusions 307 may be spaced apart in a horizontal direction.

Both side surfaces 304 may be inclined so that the distance from the lower side to the upper side of both side surfaces becomes closer so that the shielding member 380 or the bracket cover 350 can be easily inserted into the slot 302.

Figure 5:
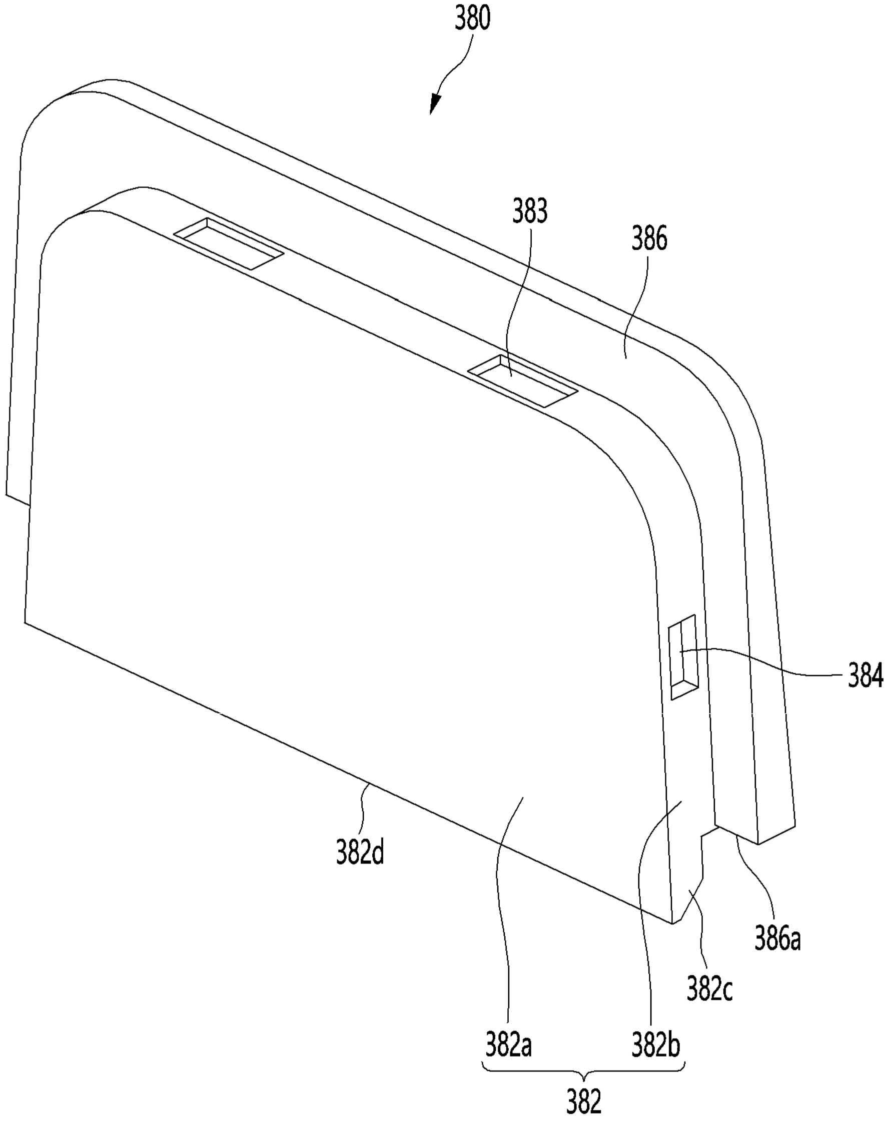
FIG. 5 is a perspective view illustrating the shielding member of the present embodiment.
Figure 6:
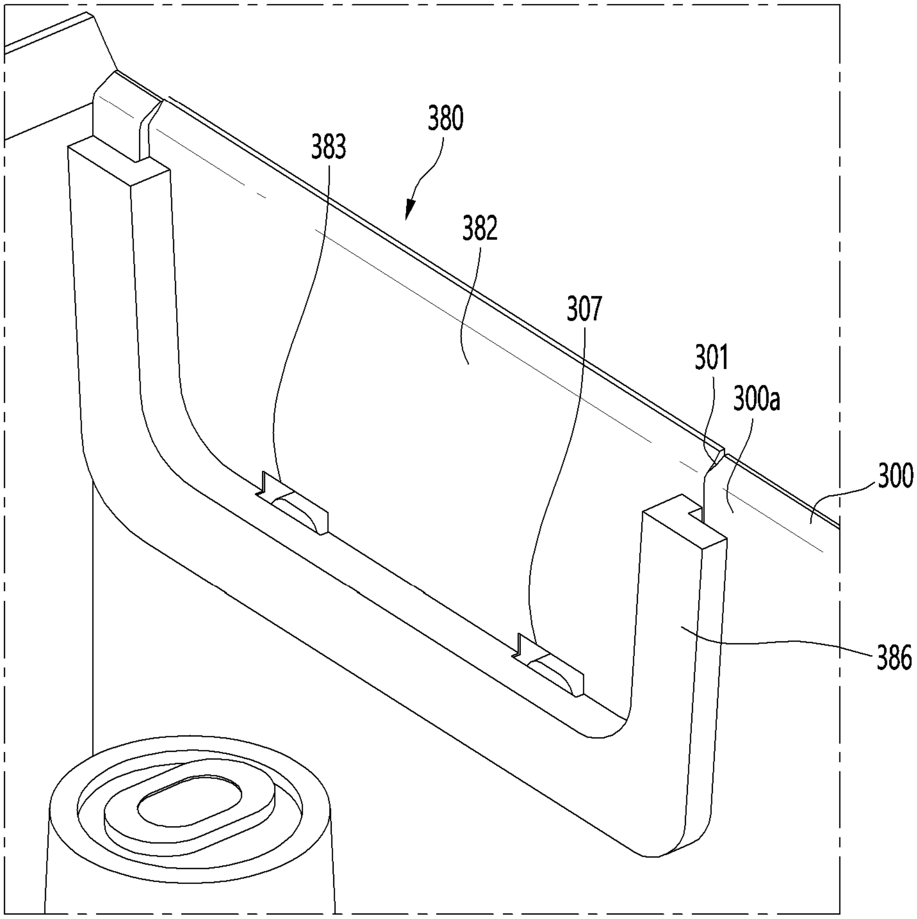
FIG. 6 is a view illustrating a state where the shielding member of the present embodiment is mounted on the hinge cover.

FIG. 5 is a perspective view illustrating the shielding member of the present embodiment, and FIG. 6 is a view illustrating a state where the shielding member of the present embodiment is mounted on the hinge cover.

Referring to FIGS. 4 to 6, the shielding member 380 may include a coupling body 382 inserted into the slot 302. The coupling body 382 may be formed in a shape corresponding to the slot 302.

The coupling body 382 may include a front surface 382*a* and a circumferential surface 382*b* extending from the front surface 382*a*.

The circumferential surface 382*b* includes both side surfaces and an upper surface, and a protrusion groove 384 into which the fixing protrusion 306 is inserted may be formed on each of both side surfaces.

A protrusion hole 383 through which the restriction protrusion 307 passes may be formed on the upper surface of the circumferential surface 382*b*.

In the process of mounting the shielding member 380 to the first mounting part 301, the fixing protrusion 306 is inserted through the inlet of the protrusion groove 384, and the restriction protrusion 307 can pass through the protrusion hole 383.

The shielding member 380 may further include a coupling guide 386 extending from the circumferential surface 382*b*. The coupling guide 386 is located on the opposite side of the front surface 382*a* with respect to the circumferential surface 382*b*.

A part of the coupling guide 386 may extend in a direction away from each other on both sides of the circumferential surface 382*b*, and another part thereof may extend upward from the circumferential surface 382*b*.

Accordingly, the distance between both end parts of the coupling guide 386 is greater than the widths of the front surface 382*a* in the left and right direction. In addition, the upper end of the coupling guide 386 is located higher than the upper surface of the circumferential surface 382*b*.

Accordingly, in a state where the coupling body 382 of the shielding member 380 is aligned with the slot 302, the coupling guide 386 can be brought into contact with the rear surface 300*a* of the front wall 300 of the hinge cover 30. In this way, when the shielding member 380 is raised while the coupling guide 386 is in contact with the rear surface 300*a* of the front wall 300, the coupling body 382 can be stably moved upwards in a state where movement of the coupling body 382 is restricted in the slot 302 in the front and rear direction.

The coupling guide 386 is located at the rear side of the front wall 300 in a state where the shielding member 380 is mounted on the first mounting part 301.

Accordingly, the coupling guide 386 may restrict the separation of the shielding member 380 forward in a state where the shielding member 380 is mounted on the first mounting part 301.

The coupling body 382 may be formed in a shape and size corresponding to the slot 302. Even if the coupling body 382 is formed in a slightly smaller shape than the slot 302 due to an error in the manufacturing process, the gap between the coupling body 382 and the face forming the slot 302 can be covered by the coupling guide 386.

The coupling body 382 may further include an extension part 382*c* covering a part of the cabinet 10. The extension part 382*c* extends downward from the lower end part of the front surface 382*a*.

Accordingly, the lower end 382*d* of the extension part 382*c* is located lower than the lower end of the circumferential surface 382*b* and the lower end 386*a* of the coupling guide 386. The extension part 382*c* may cover a connection wall 102*a* (see FIG. 10) of the cabinet 10 to be described later.

Figure 7:
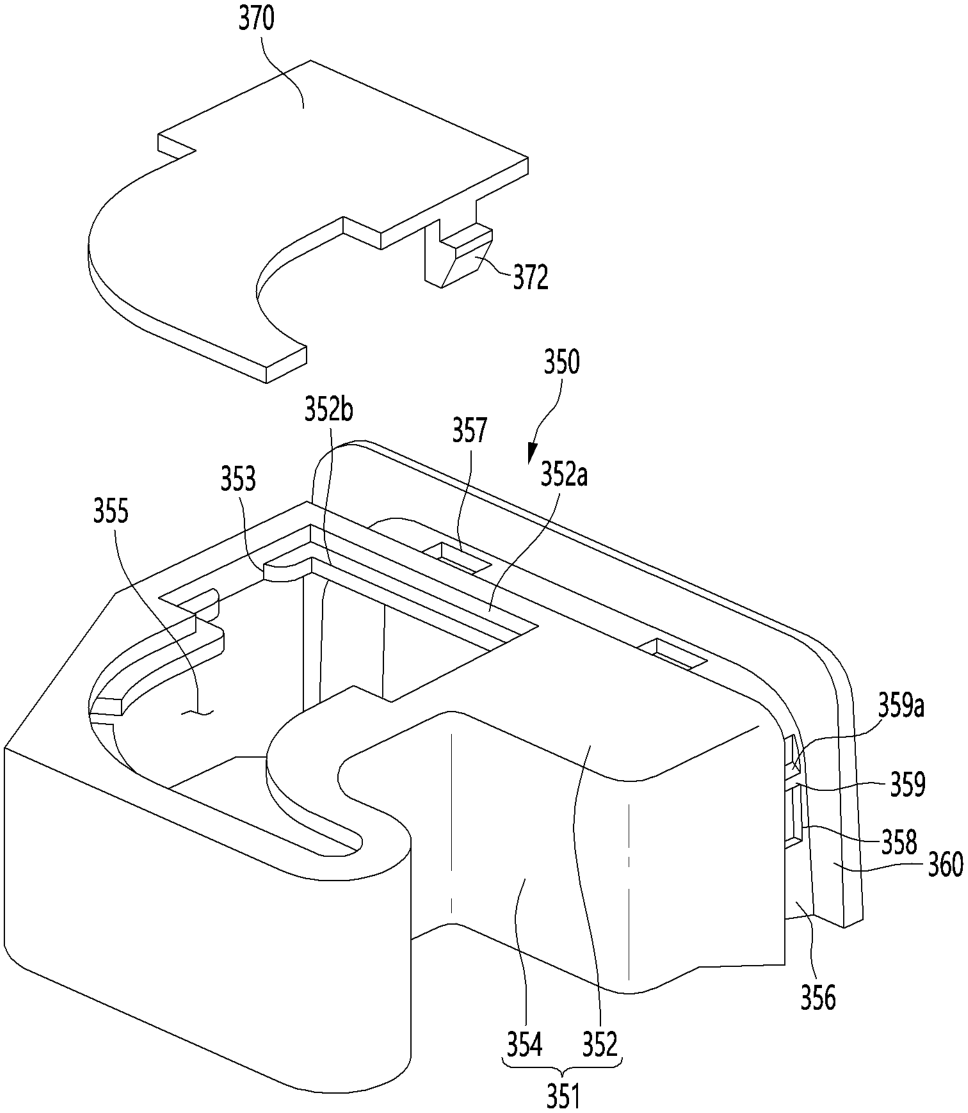
FIG. 7 is a perspective view illustrating a state where the bracket cover and the opening cover of the present embodiment are separated.
Figure 8:
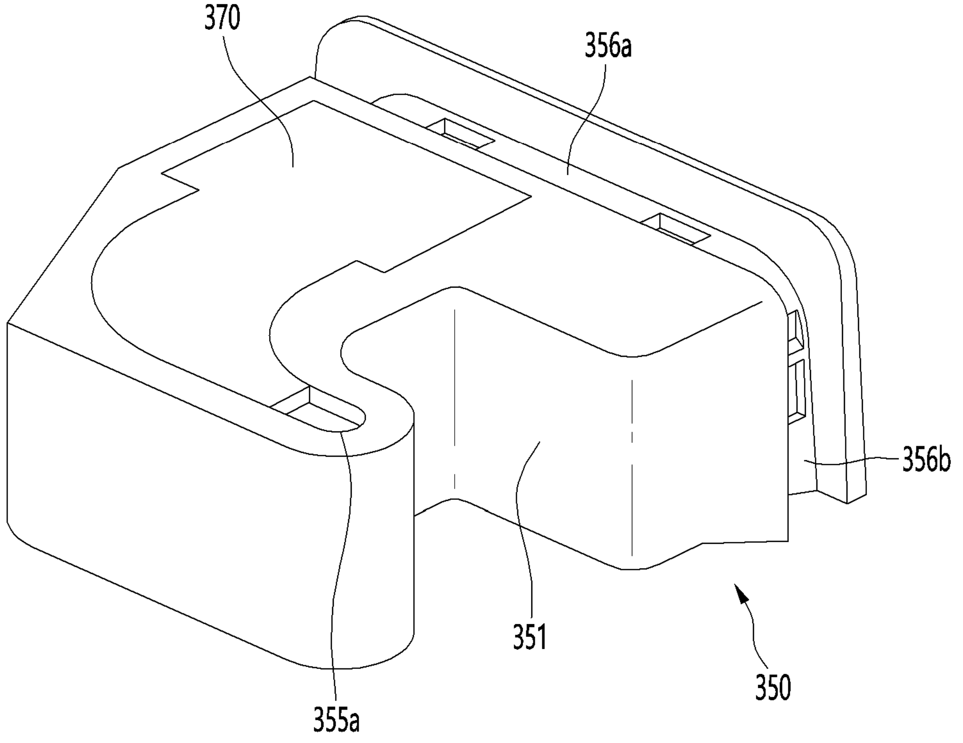
FIG. 8 is a view illustrating a state where the opening cover is coupled to the bracket cover in FIG. 7.
Figure 9:
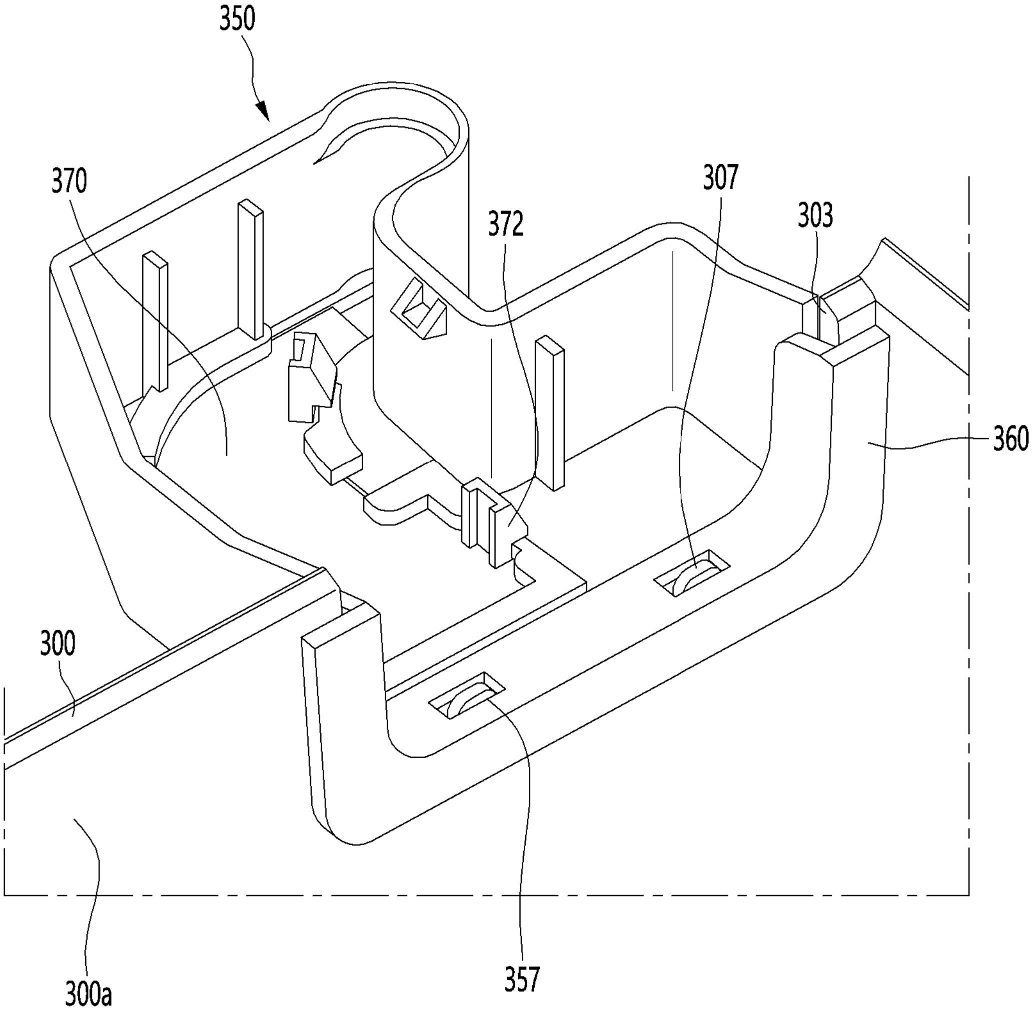
FIG. 9 is a view illustrating a state where the bracket cover is mounted on the hinge cover.

FIG. 7 is a perspective view illustrating a state where the bracket cover and the opening cover of the present embodiment are separated, FIG. 8 is a view illustrating a state where the opening cover is coupled to the bracket cover in FIG. 7, and FIG. 9 is a view illustrating a state where the bracket cover is mounted on the hinge cover.

Referring to FIGS. 4, 7 to 9, the bracket cover 350 may include a cover body 351 for covering the hinge bracket 390.

The cover body 351 may include an upper wall 352 and a circumferential wall 354 extending downward from the upper wall 352. The lower side of the cover body 351 may be opened. In other words, the cover body 351 may include a lower opening.

Accordingly, the upper wall 352 and the circumferential wall 354 may form a space 355 therein, and a part of the hinge bracket 390 may be received in the space 355. Corresponding to the shape of the hinge bracket 390, a part of the upper wall 352 may have a shape bent in the horizontal direction at least once.

An opening **352*b* may be formed in the upper wall 352. An electric wire and a connector for connecting an electric wire may pass through the opening 352*b*. In addition, the connector may be located in the space 355**.

The bracket cover 350 may further include an opening cover 370 covering the opening **352*b*. The upper wall 352 of the cover body 351 includes a seating part 352*a* recessed downward so that the opening cover 370 is prevented from protruding upward while covering the opening 352*b*, and the opening 352*b* may be formed in the seating part 352*a***.

The recession depth of the seating part **352*a* may be substantially the same as the thickness of the opening cover 370**.

The opening cover 370 may include a hook 372 to be coupled to the cover body 351. The hook 372 may extend downward from the edge of the opening cover 370.

A slit 353 through which the hook 372 passes is formed in the seating part **352*ba*, and after the hook 372 passes through the slit 353, the hook 372 may engage the lower surface of the wall forming the seating part 352*a***.

In a state where the opening cover 370 is coupled to the cover body 351, a part of the opening **352*b* is exposed to the outside. In other words, the opening cover 370 covers a part of the opening 352*b* and does not cover the other part of the opening 352*b***.

In the opening **352*b*, a part 355 not covered by the opening cover 370** provides a space for the electric wire to be located.

The bracket cover 350 may further include a coupling part 356 extending from the cover body 351. The coupling part 356 may include an upper surface **356*a* and both side surfaces 356*b***.

The upper surface **356*a* of the coupling part 356 may be located lower than the upper wall 352. The width between both side surfaces 356*b* of the coupling part 356 may be formed smaller than the widths of the bracket cover 350** in the left and right direction.

The coupling part 356 may be formed in a shape and size corresponding to the slot 302 of each of the mounting parts 301, 303.

Both side surfaces **356*b* of the coupling part 356 may include protrusion grooves 358 for coupling the fixing protrusions 306 of the mounting parts 301 and 303**.

In the protrusion groove 358, an engagement protrusion 359 for engaging the fixing protrusion 306 in a state where the fixing protrusion 306 is received may be provided. An inclined surface **359*a* for the fixing protrusion 306 to ride over may be formed on the upper side of the engagement protrusion 359**.

The upper surface **356*a* of the coupling part 356 may have a protrusion hole 357 through which the restriction protrusion 307** passes.

In the process of mounting the bracket cover 350 to the mounting parts 301, 303, the fixing protrusion 306 is inserted through the inlet of the protrusion groove 358, and the restriction protrusion 307 can pass through the protrusion hole 357.

In this state, when the bracket cover 350 is additionally raised, the fixing protrusion 306 moves relatively along the inclined surface **359*a* of the engagement protrusion 359 and finally engages on the lower surface of the engagement protrusion 359 within the protrusion groove 358**.

The user can feel that the fixing protrusion 306 engages the lower surface of the engagement protrusion 359 within the protrusion groove 358, and accordingly, it can be checked that the bracket cover 350 is normally mounts on the mounting parts 301, 303.

The bracket cover 350 may further include a coupling guide 360 extending from the coupling part 356. The coupling guide 360 is located on the opposite side of the cover body 351 with respect to the coupling part 356.

A part of the coupling guide 360 may extend in a direction away from each other on both sides of the coupling part 356, and other parts thereof may extend upward from the coupling part 356.

Therefore, the distance between both end parts of the coupling guide 360 is greater than the width of the coupling part 356 in the left and right direction. In addition, the upper end of the coupling guide 360 is located higher than the upper surface **356*a* of the coupling part 356**.

The width of the coupling part 356 in the front and rear direction may be substantially the same as the width of the slot 302 in the front and rear direction.

Therefore, in a state where the coupling part 356 of the bracket cover 350 is aligned with the slot 302, the coupling guide 360 can be brought into contact with the rear surface **300*a* of the front wall 300 of the hinge cover 30. In this way, when the bracket cover 350 is raised while the coupling guide 360 is brought into contact with the rear surface 300*a* of the front wall 300, the coupling part 356 can be stably moved upwards in a state where the movement of the coupling part 356 in the front and rear direction is restricted within the slot 302**.

The coupling guide 360 is located on the rear side of the front wall 300 in a state where the bracket cover 350 is mounted on the mounting parts 301 and 303.

Accordingly, the coupling guide 360 may restrict separation of the bracket cover 350 forward in a state where the bracket cover 350 is mounted on the mounting parts 301 and 303.

Figure 10:
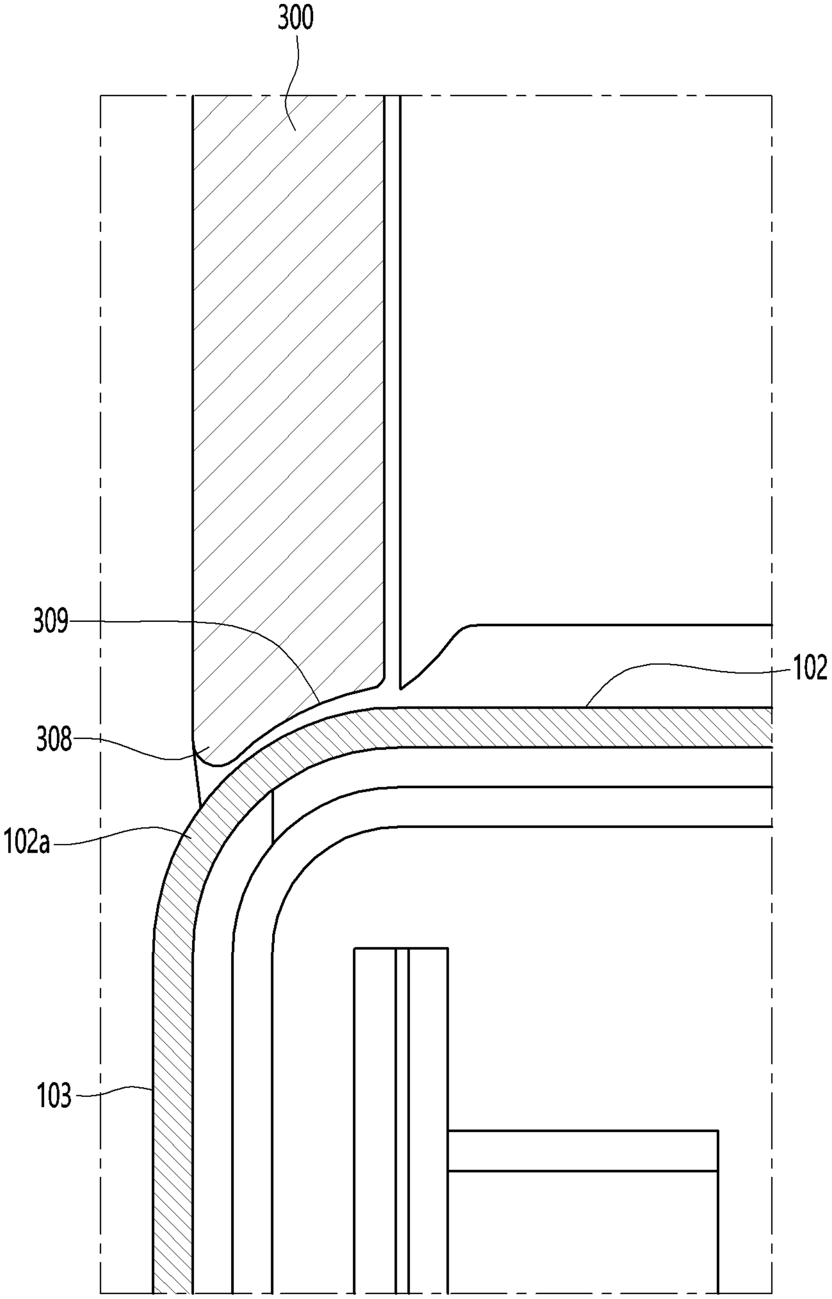
FIG. 10 is a cross-sectional view taken along line 10-10 of FIG. 2.

FIG. 10 is a cross-sectional view taken along line 10-10 of FIG. 2.

Referring to FIG. 10, the cabinet 10 may include an upper wall 102 and a front wall 103. In the manufacturing process of the cabinet 10, the upper wall 102 and the front wall 103 may be connected by a rounded connection wall **102*a***.

In a state where the hinge cover 30 is coupled to the upper wall 102 of the cabinet 10, the lower end part 308 of the front wall 300 of the hinge cover 30 can cover the connection wall **102*a*. For example, the lower end part 308 of the front wall 300 may be located lower than the upper wall 102. The front wall 300 may include a round surface 309 having a curvature corresponding to or similar to the connection wall 102*a* so as not to interfere with the connection wall 102*a***.

Accordingly, in a state where the hinge cover 30 is coupled to the upper wall 102 of the cabinet 10, it can be prevented that a gap is generated between the connection wall **102*a* of the cabinet 10 and the front wall 300 of the hinge cover 30**.

Figure 11:
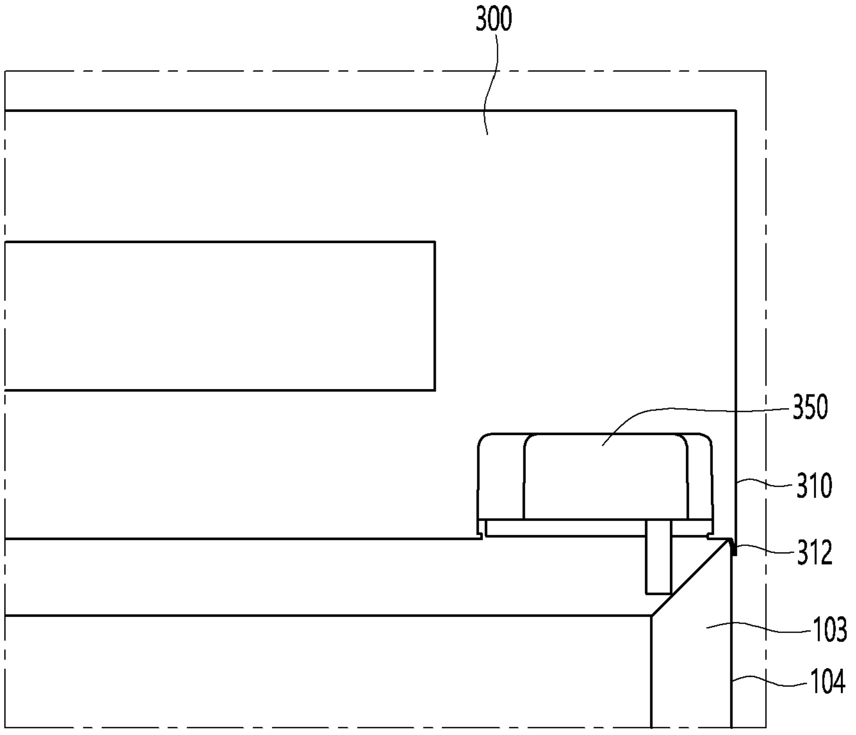
FIG. 11 is a front view illustrating a state where the hinge cover is coupled to the cabinet.

FIG. 11 is a front view illustrating a state where the hinge cover is coupled to the cabinet.

Referring to FIG. 11, each side wall 310 of the hinge cover 30 may further include an extension part 312 extending downward to cover the side wall 104 of the cabinet 10.

By the extension part 312, it can be prevented that a gap is generated between the upper wall 102 and the side wall 310 of the hinge cover 30.

Figure 12:
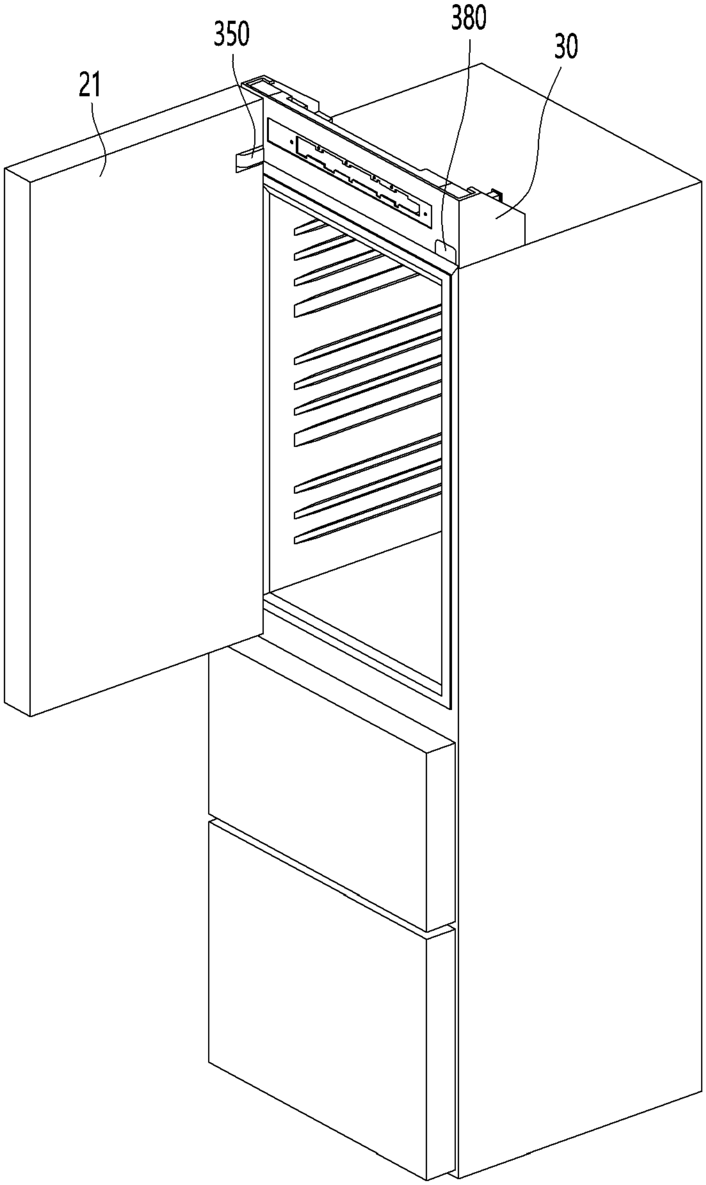
FIG. 12 is a view illustrating a state where the rotation direction of the door of FIG. 1 is changed.

FIG. 12 is a view illustrating a state where the rotation direction of the door of FIG. 1 is changed.

Referring to FIGS. 1, 3, and 12, in order to change the rotation direction of the door 21, the hinge cover 30 may be separated from the cabinet 10. Then, the shielding member 380 coupled to the first mounting part 301 of the hinge cover 30 and the hinge cover 30 coupled to the second mounting part 303 are separated.

Then, after changing the position of the hinge bracket 390, or separating the hinge bracket 390, a new hinge bracket having a symmetrical shape of the hinge bracket 390 can be installed in a changed position in the upper wall 102 of the cabinet 10.

Thereafter, the bracket cover 350 or a new bracket cover having a symmetrical shape thereof may be mounted on the first mounting part 301, and the shielding member 380 may be mounted on the second mounting part 303.

Finally, the hinge cover 30 may be fixed to the upper wall 102 of the cabinet 10.

According to the proposed embodiment, without replacing the entire hinge cover, by replacing the bracket cover detachably coupled to the hinge cover or by changing the position of the bracket cover and the shielding member, the rotation direction of the door can be changed. Therefore, there is an advantage that the cost for changing the rotation direction of the door is reduced.

In addition, since the shielding member is coupled to the mounting part where the bracket cover is not used, the slot can be prevented from being exposed to the outside.

In addition, since the opening is formed in the bracket cover, there is an advantage in that the electric wire connection operation is easy, and after the electric wire connection is completed, the opening is covered by the opening cover, so that the opening can be prevented from being exposed to the outside.

What is claimed is:

1. A refrigerator comprising:
- a cabinet defining a storage space;
- a hinge coupled to the cabinet, the hinge including:
  - a hinge bracket configured to be selectively positioned at one of a first location or a second location on the cabinet, and
  - a hinge shaft extending from the hinge bracket;
- a door rotatably coupled to the hinge and configured to open and close at least a portion of the storage space, the door defining a front surface of the refrigerator and being configured (i) based on the hinge being positioned at the first location, to rotate around the hinge shaft in a first direction and (ii) based on the hinge being positioned at the second location, to rotate around the hinge shaft in a second direction opposite the first direction; and
- a hinge cover configured to at least partially cover the hinge bracket, the hinge cover including (i) a cover body that has a front wall that extends above an upper wall of the cabinet and (ii) a mounting portion that is configured to accommodate the hinge, wherein the upper wall of the cabinet faces in an upward direction,
- wherein at least a portion of the hinge and at least a portion of the mounting portion are positioned higher than the upper wall,
- wherein a portion of the door extends above the upper wall of the cabinet such that an upper edge of the door is positioned higher than the upper wall,
- wherein the portion of the door extending above the cabinet defines a recess configured to accommodate the hinge shaft,
- wherein the door is configured, based on closing the storage space, to cover the front wall of the cover body, and
- wherein the hinge cover defines an additional mounting portion that is defined at the front wall, the additional mounting portion and the mounting portion being provided as an additional mounting portion slot and a mounting portion slot, respectively, the additional mounting portion slot and the mounting portion slot being defined at opposing lateral end portions of the front wall.

2. The refrigerator of claim 1, wherein the recess in the door is recessed inward from a side edge of the door and provided underneath the upper edge of the door.

3. The refrigerator of claim 1, wherein the hinge cover is configured to at least partially cover an upper surface of the hinge bracket.

4. The refrigerator of claim 1, wherein the mounting portion is configured to accommodate the hinge based on the hinge being positioned at one of the first location or the second location, and wherein the additional mounting portion is configured to accommodate the hinge based on the hinge being positioned at the other of the first location or the second location.

5. The refrigerator of claim 4, wherein the hinge cover includes a bracket cover configured to be mounted at the mounting portion to thereby cover the mounting portion slot.

6. The refrigerator of claim 5, wherein the hinge cover includes a shielding cover configured to be mounted at the additional mounting portion to cover the additional mounting portion slot.

7. The refrigerator of claim 1, wherein the additional mounting portion slot and the mounting portion slot are defined at the front wall and recessed upward from a lower surface of the front wall of the cover body.

8. The refrigerator of claim 5, wherein the bracket cover includes:
- a bracket cover body configured to cover the hinge bracket; and
- a coupling part extending from the bracket cover body and corresponding to the mounting portion slot.

9. The refrigerator of claim 1, wherein the cover body includes a pair of side walls that extend rearward from opposite lateral ends of the front wall.

10. The refrigerator of claim 9, wherein the side walls extend rearward along the upper wall of the cabinet.

11. The refrigerator of claim 10, wherein the hinge shaft extends downward from the hinge bracket.

12. A refrigerator comprising:
- a cabinet defining a storage space;
- a hinge coupled to the cabinet, the hinge being configured to be selectively positioned at a first location on the cabinet or at a second location on the cabinet opposite the first location;
- a door coupled to the hinge and configured to open and close at least a portion of the storage space, the door defining a front surface of the refrigerator and being configured (i) based on the hinge being positioned at the first location, to open in a first direction and (ii) based on the hinge being positioned at the second location, to open in a second direction opposite the first direction; and
- a hinge cover configured to at least partially cover the hinge, the hinge cover including (i) a cover body that has a front wall and side walls that extend rearward from opposite ends of the front wall and (ii) a mounting portion that is configured to accommodate the hinge, wherein the front wall and the side walls of the hinge cover extend above an upper wall of the cabinet, wherein the upper wall of the cabinet faces in an upward direction, wherein at least a portion of the hinge and at least a portion of the mounting portion are positioned higher than the upper wall, wherein a portion of the door extends above the upper wall of the cabinet such that an upper edge of the door is positioned higher than the upper wall, wherein the portion of the door extending above the cabinet defines a recess configured to accommodate the hinge, wherein the door is configured, based on closing the storage space, to cover the front wall of the cover body, and wherein the hinge cover defines an additional mounting portion that is defined at the front wall, the additional mounting portion and the mounting portion being provided as an additional mounting portion slot and a mounting portion slot, respectively, the additional mounting portion slot and the mounting portion slot being defined at opposing lateral end portions of the front wall.

13. The refrigerator of claim 12, wherein the recess in the door is recessed inward from a side edge of the door and provided underneath the upper edge of the door.

14. The refrigerator of claim 12, wherein the hinge cover is configured to at least partially cover an upper surface of the hinge.

15. The refrigerator of claim 12, wherein the mounting portion is configured to accommodate the hinge based on the hinge being positioned at one of the first location or the second location, and wherein the additional mounting portion is configured to accommodate the hinge based on the hinge being positioned at the other of the first location or the second location.

16. The refrigerator of claim 15, wherein the hinge cover includes a bracket cover configured to be mounted at the mounting portion to thereby cover the mounting portion slot.

17. The refrigerator of claim 15, wherein the hinge cover includes a shielding cover configured to be mounted at the additional mounting portion to cover the additional mounting portion slot.

18. The refrigerator of claim 15, wherein the hinge includes (i) a hinge bracket configured to be coupled to the upper wall of the cabinet and (ii) a hinge shaft that extends downward from the hinge bracket.

* * * * *